US012755589B1

(12) United States Patent
Du

(10) Patent No.: US 12,755,589 B1
(45) Date of Patent: Oct. 6, 2026

(54) RETROFIT ACCESS CONTROL SYSTEM WITH HYBRID SIGNAL ISOLATION, UNIVERSAL ADAPTIVE INTERFACE, SHARED-BUS TOPOLOGY, AND LEGACY COEXISTENCE PIGGYBACK ARCHITECTURE

(71) Applicant: Zheng Du, Irvine, CA (US)

(72) Inventor: Zheng Du, Irvine, CA (US)

( * ) Notice: Subject to any disclaimer, the term of this patent is extended or adjusted under 35 U.S.C. 154(b) by 0 days.

(21) Appl. No.: 19/546,448

(22) Filed: Feb. 23, 2026

Related U.S. Application Data

(63) Continuation-in-part of application No. 19/458,686, filed on Jan. 24, 2026, which is a continuation-in-part of application No. 19/390,767, filed on Nov. 17, 2025.

(51) Int. Cl.
*G07C 9/00* (2020.01)

(52) U.S. Cl.
CPC ..... *G07C 9/00571* (2013.01); *G07C 9/00309* (2013.01); *G07C 2009/00412* (2013.01)

(58) Field of Classification Search
CPC ............ G07C 9/00571; G07C 9/00309; G07C 2009/00412; E06B 9/72; E06B 2009/6818; H04B 3/56; H04B 3/548; H04L 67/125
See application file for complete search history.

(56) References Cited

U.S. PATENT DOCUMENTS

| | | | | |
|---|---|---|---|---|
| 2018/0048309 | A1* | 2/2018 | Vogt, IV | H04B 3/548 |
| 2019/0089411 | A1* | 3/2019 | Olmstead | H04B 3/548 |
| 2020/0300037 | A1* | 9/2020 | Blair | H02J 1/08 |

* cited by examiner

*Primary Examiner* — Vernal U Brown

(57) ABSTRACT

A retrofit access control system uses existing legacy cabling to provide deterministic door control and high-bandwidth data transport without requiring a packet-network round trip for door actuation. A first conductor pair carries DC power and modulated packet data superimposed on the DC power using carrier-wave modulation, while a second conductor pair is dedicated to a physically isolated baseband lane that carries reserved door-state tokens used by a secure-side controller to actuate a door relay deterministically. The system supports multiple wiring permutations including a 2-wire rescue mode and shared-bus multi-drop deployments. In a legacy coexistence embodiment, the system conditions DC power to supply a legacy reader while blocking carrier-wave energy, detects a hardware trigger from a legacy access panel, and transmits a deterministic reverse-token over the isolated baseband lane to synchronize visual media capture with the legacy access decision without relying on network latency.

30 Claims, 13 Drawing Sheets

Identity fusion aligns a deterministic capture event with a separate identity log using timestamps and/or correlation identifiers.

Note: reserved tokens are disjoint from credential identifiers (facility-code exclusion, parity, header flag, or length).

LOCKDOWN overrides other states until a privileged RETURN is received.

Mode selection may be manual (switch/software) or automatic (line characteristic detection).

In Rescue Mode, continuous high-bandwidth traffic may be reduced; tokens and supervision are exchanged in scheduled bursts.

152: DC + modulated packet data
154: baseband token lane (OT)
156: auxiliary pair (optional power injection, sensors, lock power)

152: DC + modulated packet data
154: baseband token lane (OT)
158/159: additional pair(s) for bonded power, dedicated lock power, or auxiliary lanes Multi-drop OT bus supports ingress/egress readers.
Readers may use addressing, scheduled access, or arbitration to avoid collisions.

Identity fusion aligns a deterministic capture event with a separate identity log using timestamps and/or correlation identifiers.

RETROFIT ACCESS CONTROL SYSTEM WITH HYBRID SIGNAL ISOLATION, UNIVERSAL ADAPTIVE INTERFACE, SHARED-BUS TOPOLOGY, AND LEGACY COEXISTENCE PIGGYBACK ARCHITECTURE

CROSS-REFERENCE TO RELATED APPLICATIONS

This application is a Continuation-in-Part (CIP) of, and claims the benefit of, U.S. patent application Ser. No. 19/458,686, filed Jan. 23, 2026, entitled "RETROFIT ACCESS CONTROL SYSTEM WITH HYBRID SIGNAL ISOLATION AND UNIVERSAL ADAPTIVE INTERFACE", which claims priority to U.S. patent application Ser. No. 19/390,767, filed Nov. 17, 2025, entitled "READER-LOCALIZED HEAVY CREDENTIALING WITH HARD-WIRED DOOR-STATE MIRRORING TO A SECURE-SIDE CONTROLLER." The entire disclosures of each of the above-identified applications are incorporated herein by reference.

TECHNICAL FIELD

The disclosure relates to electronic access control systems, reader-controller interfaces, retrofit wiring topologies, and deterministic door actuation. More specifically, the disclosure relates to adaptive architectures that (i) transmit DC power and high-bandwidth packet data over legacy cabling using carrier-wave modulation while (ii) maintaining a physically isolated, baseband door-control lane for secure door-state mirroring and supervision, including shared-bus multi-drop deployments and non-disruptive retrofit/piggyback installation alongside legacy controllers and legacy credential readers.

BACKGROUND

Conventional access control deployments typically fall into two categories. In a first category, legacy systems (e.g., Wiegand or low-speed serial) provide deterministic actuation but lack the bandwidth required for routine transport of visual media, biometric templates, mobile credential payloads, or frequent software/credential updates. In a second category, IP-based readers can transport visual media and large datasets but can introduce unacceptable actuation latency and reliability risks when an unlock decision shares a congested packet network path with high-bandwidth traffic.

IP-based readers also face physical distance limits. Standard Ethernet runs are typically limited to approximately 100 meters, yet many retrofit facilities require reader-to-controller distances well beyond such limits, including multi-building campuses and long exterior runs. Retrofit environments further present heterogeneous physical media. A single site may include mixed-gauge and mixed-vintage copper such as untwisted security wire, partially shielded multi-conductor cable, and twisted-pair Ethernet cabling. Conventional IP readers often assume a particular media type and noise profile, rendering deployment across mixed infrastructure difficult or cost-prohibitive.

Finally, many enterprise deployments include highly encrypted legacy credentials and existing secure-side controller panels (e.g., installed access panels) that customers are reluctant to replace due to cost and operational disruption. A need exists for a reader-centric retrofit architecture that (i) preserves deterministic actuation on the secure side, (ii) enables high-bandwidth visual media capture and edge processing, (iii) adapts to a wide variety of legacy wiring conditions, and (iv) optionally coexists with and augments a legacy reader/panel without intercepting or modifying legacy credential data lines.

SUMMARY

The disclosed system addresses the above problems by physically isolating latency-sensitive door control signaling from high-bandwidth packet data transport. In a preferred retrofit configuration, a legacy cable having at least two conductor pairs is used. A first conductor pair carries DC power and modulated packet data superimposed on the DC power using a carrier-wave modulation technique. A second conductor pair is dedicated to a baseband door-state signaling channel that conveys reserved door-state tokens. Because the door-state tokens traverse a physically separate copper path from the high-bandwidth packet data, the secure-side controller can actuate a door relay deterministically without delay from packet-network congestion.

In some embodiments, the baseband door-state tokens are drawn from a reserved namespace that is disjoint from credential identifiers, such that the baseband lane does not transport credential payloads. The secure-side controller may enforce a state machine (e.g., OPEN_PULSE, HOLD_OPEN, RETURN_TO_SECURE, and optional LOCKDOWN) with timing, refresh cadence, precedence, and watchdog rules, and may supervise the door-side reader using a bidirectional heartbeat or challenge-response over the baseband lane.

The disclosed architecture further includes a universal adaptive interface that supports multiple wiring permutations (e.g., 2-wire rescue mode, 4-wire hybrid mode, 6-wire expanded mode, and 8-wire extended mode). The system uses robust modulation and adaptive signal conditioning (e.g., dynamic bit-loading, automatic gain control, slew-rate limiting, and/or dynamic impedance matching) to maintain signal integrity across twisted, untwisted, shielded, and mixed-gauge legacy cabling at distances exceeding standard Ethernet limits. In some embodiments, unused conductors are combined to provide auxiliary power injection and/or reduce voltage drop over long runs.

The disclosure also describes a legacy coexistence piggyback architecture enabling the disclosed edge reader to be installed adjacent to an existing legacy reader and legacy panel. In such embodiments, legacy credential data lines remain physically intact between the legacy reader and the legacy panel. The disclosed reader conditions power for the legacy reader via an internal filter that blocks carrier-wave energy. A secure-side hardware trigger (e.g., a monitored LED/buzzer output from the legacy panel) causes the secure-side controller to transmit a deterministic reverse-token to the disclosed reader over an isolated baseband pair, thereby triggering synchronized visual capture and indicator behavior without reliance on cloud/API latency.

DETAILED DESCRIPTION

Figure 1:
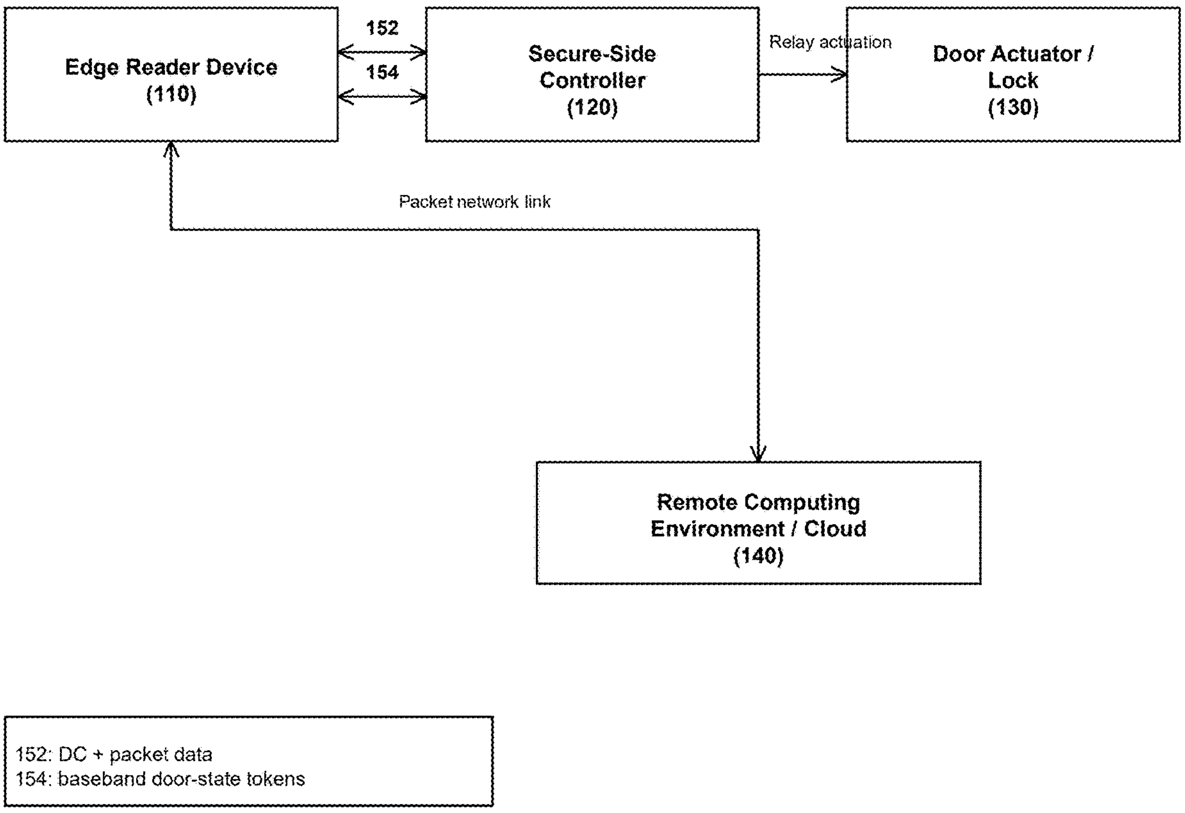
FIG. 1 shows an example system architecture including an edge reader device, a secure-side controller, a door actuator/lock, and a packet network path to a remote computing environment.
Figure 2:
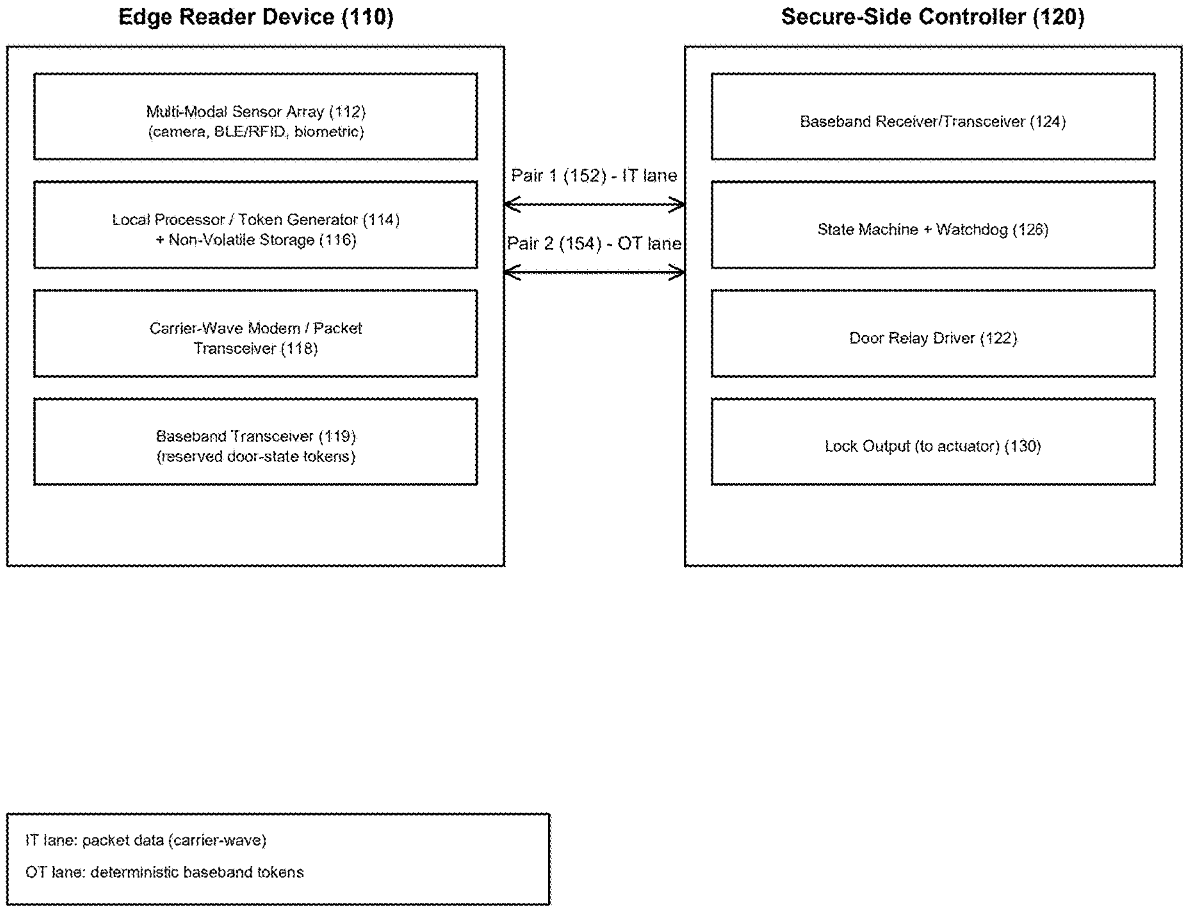
FIG. 2 illustrates an example Hybrid-Link topology (4-wire standard) with multiplexed power and packet data on a first conductor pair and an isolated baseband token lane on a second conductor pair.
Figure 3:
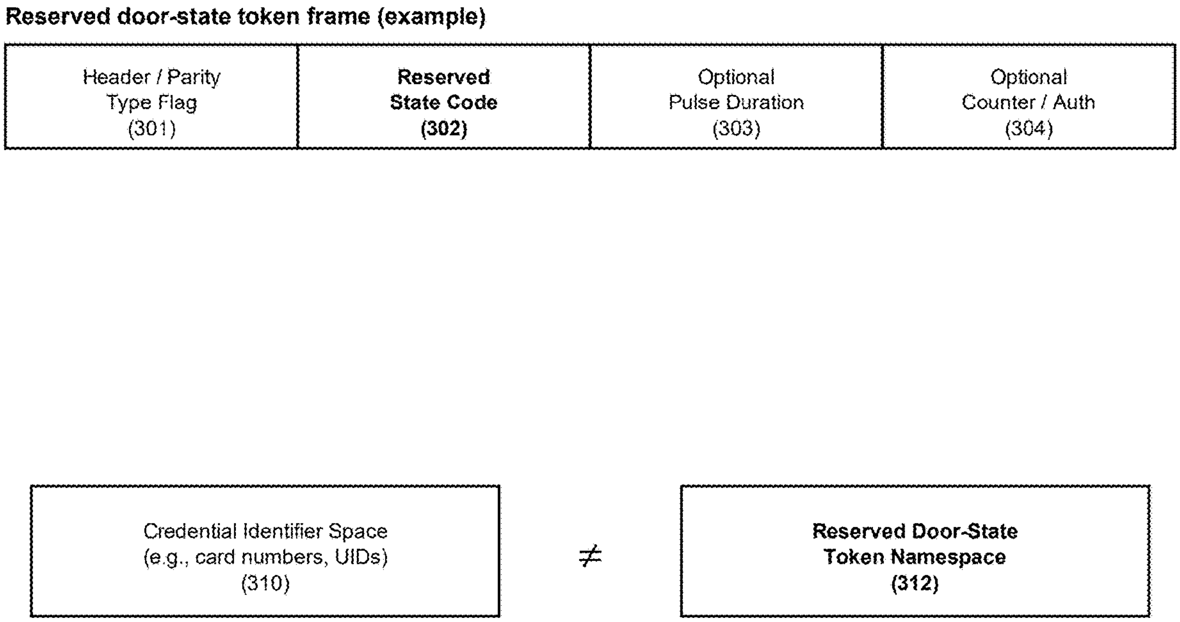
FIG. 3 illustrates an example reserved door-state token frame and an example disjoint namespace separating door-state tokens from credential identifiers.
Figure 4:
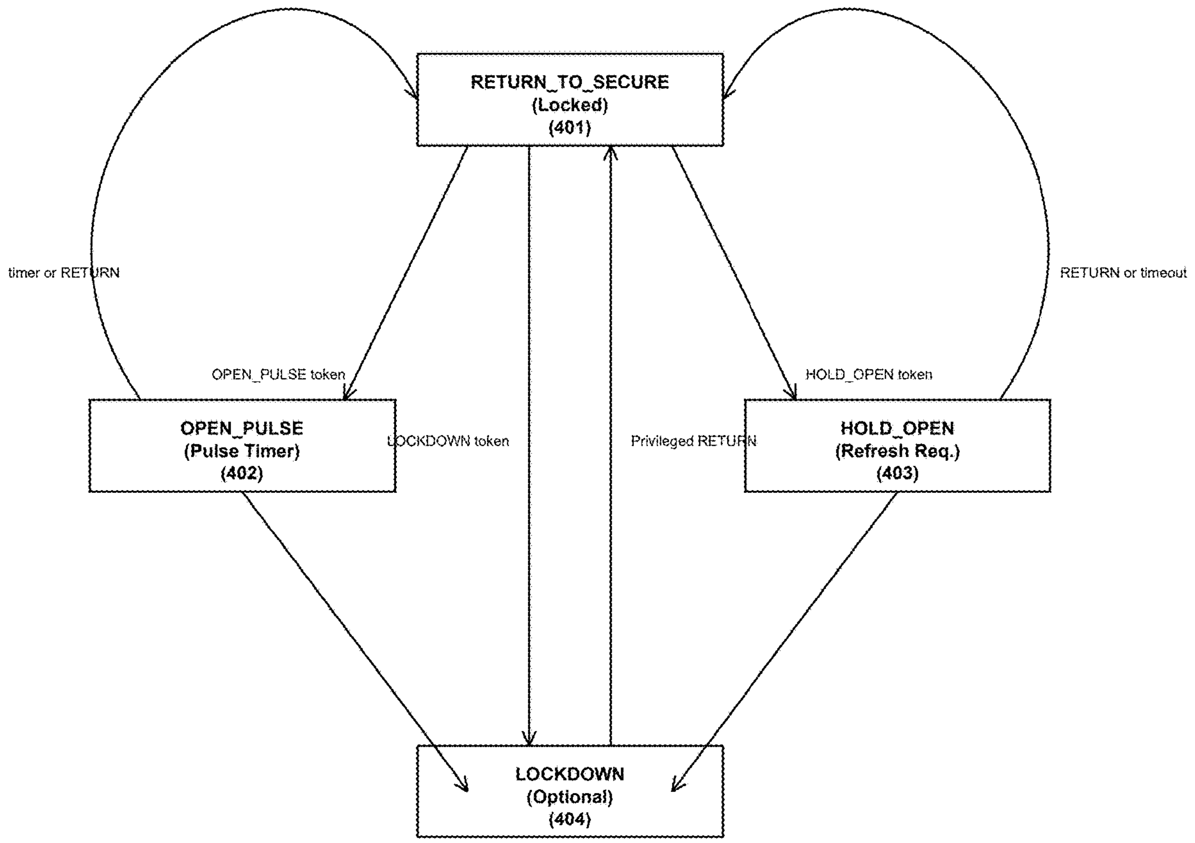
FIG. 4 illustrates an example secure-side state machine for deterministic relay actuation responsive to reserved door-state tokens.
Figure 5:
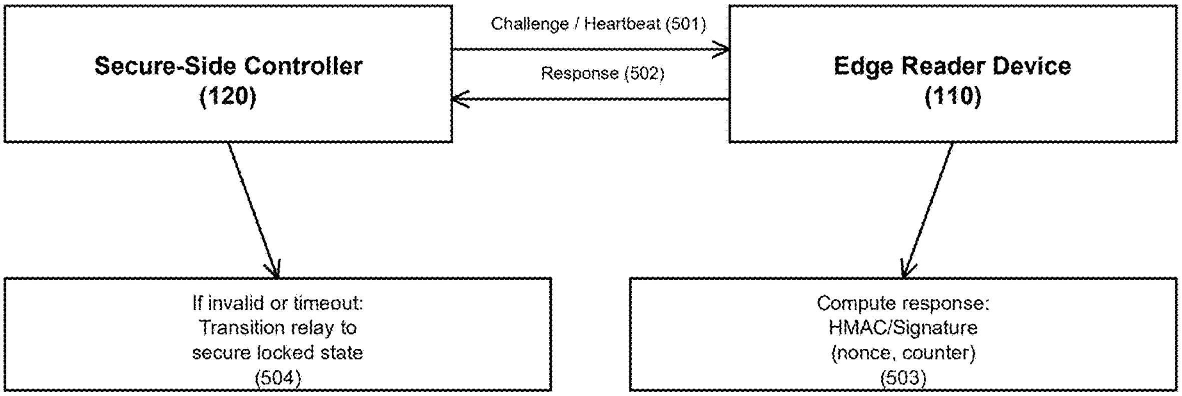
FIG. 5 illustrates an example bidirectional supervision exchange (challenge/heartbeat and response) on the isolated baseband token lane.
Figure 6:
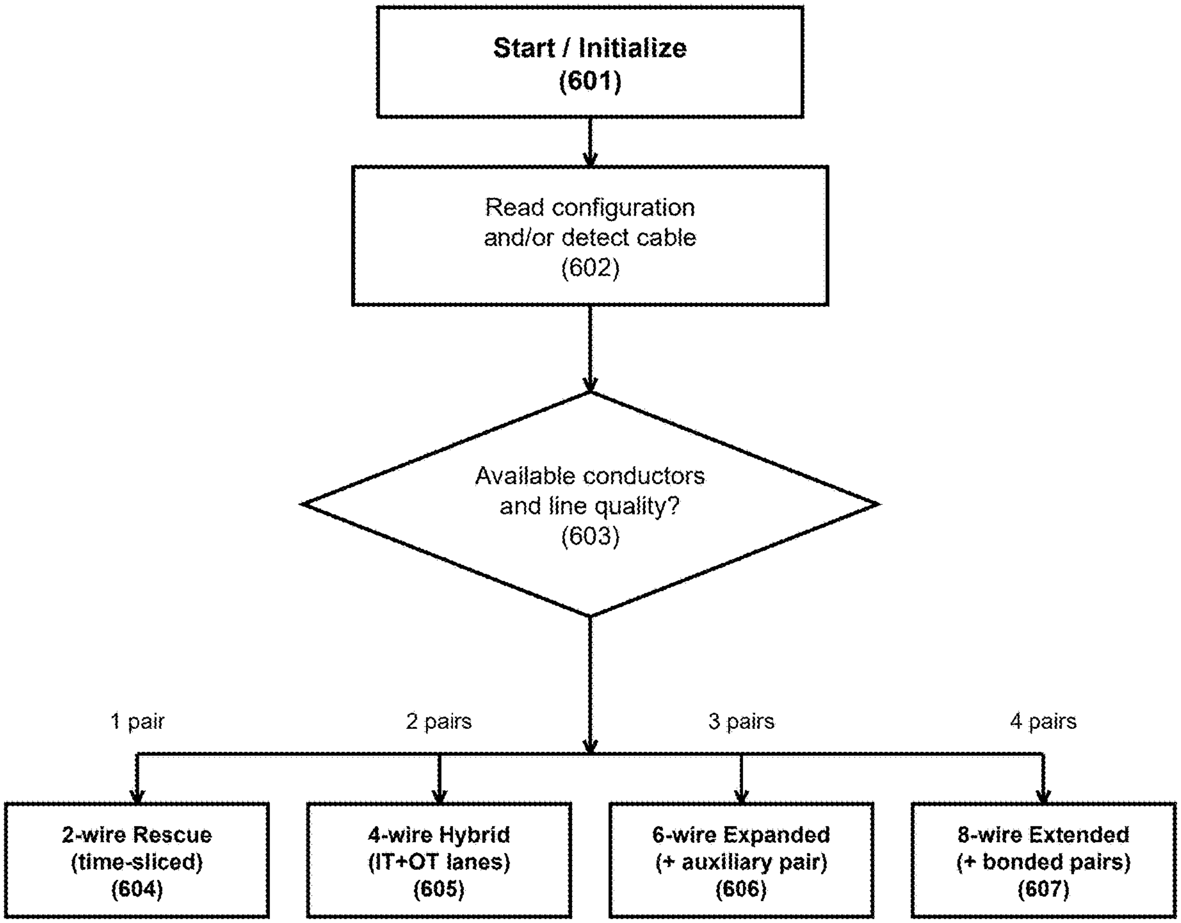
FIG. 6 illustrates an example logic flowchart for a universal adaptive interface configured to select among wiring topologies.
Figure 7:
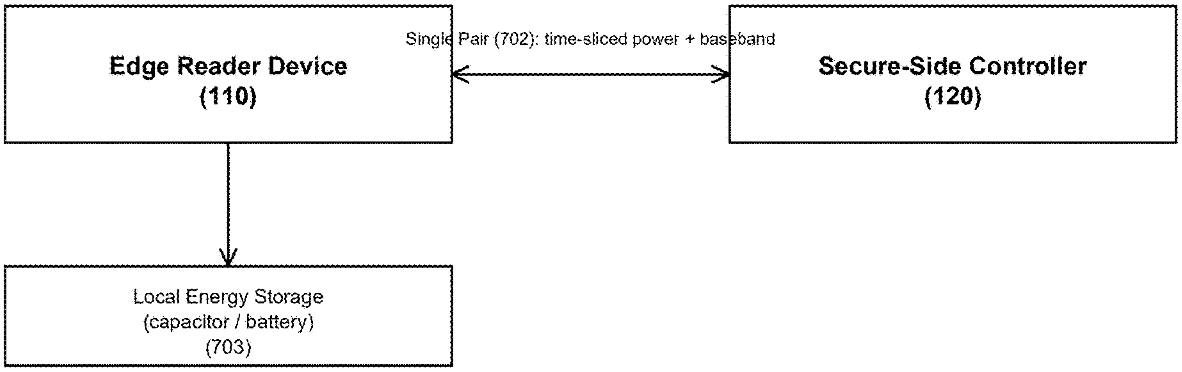
FIG. 7 illustrates an example Rescue Mode topology using a single conductor pair and time-sliced delivery of power and baseband signaling.
Figure 7:
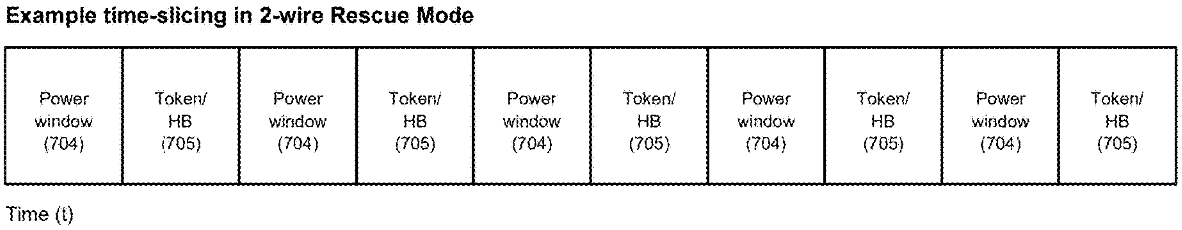
Figure 8:
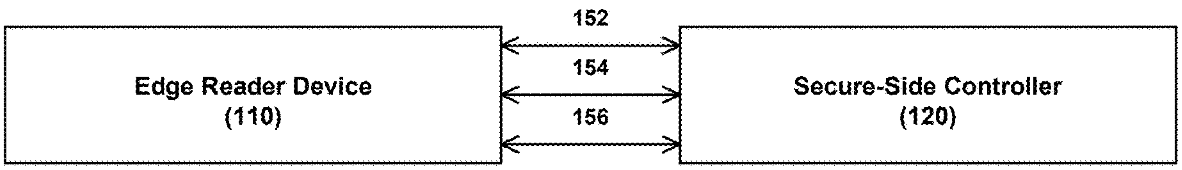
FIG. 8 illustrates an example 6-wire expanded topology including an auxiliary conductor pair for additional power, lock power, and/or auxiliary inputs.
Figure 9:
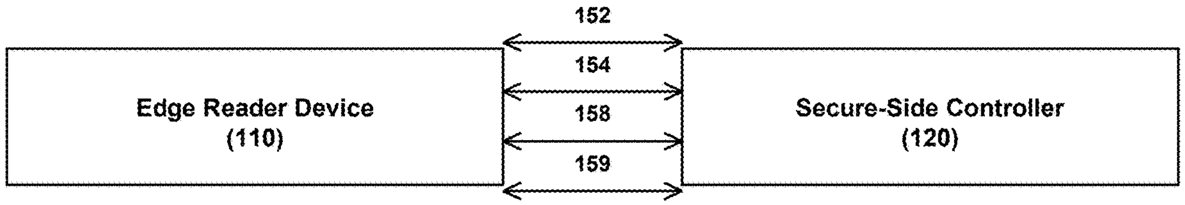
FIG. 9 illustrates an example 8-wire extended topology including additional conductor pairs that may be bonded or dedicated to higher-current power delivery and/or auxiliary lanes.
Figure 10:
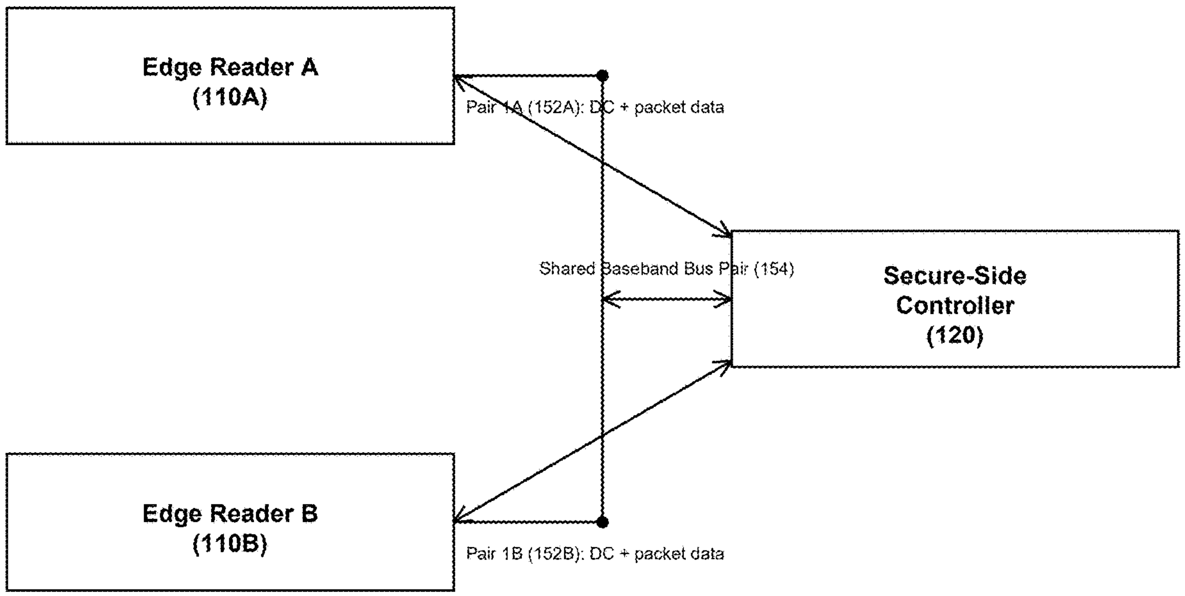
FIG. 10 illustrates an example shared-bus and multi-drop topology supporting multiple edge readers on a common baseband token lane.
Figure 11:
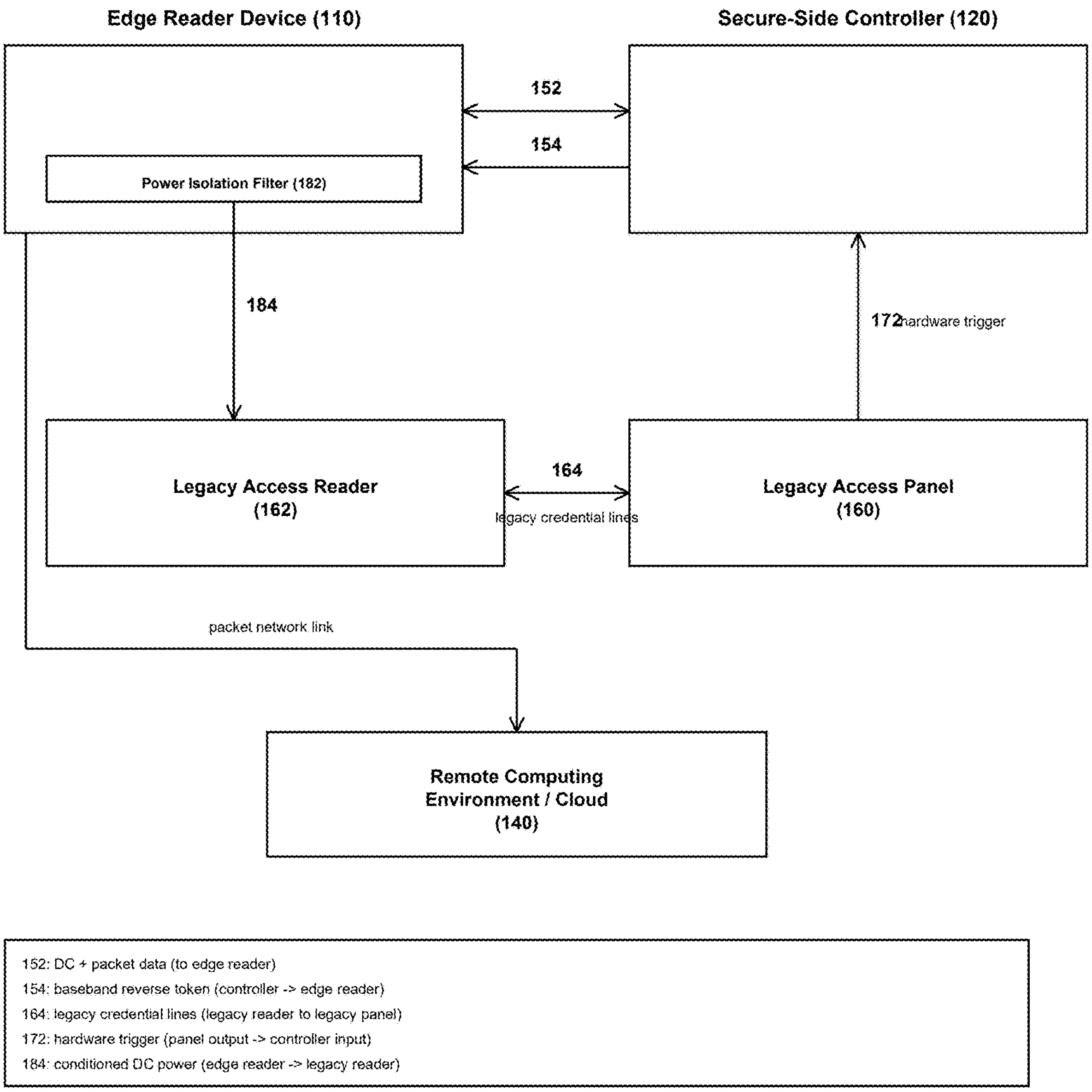
FIG. 11 illustrates an example legacy coexistence (piggyback retrofit) topology in which a legacy panel and legacy reader remain electrically intact while a reverse token deterministically triggers media capture and indicator actuation by an edge reader device.
Figure 12:
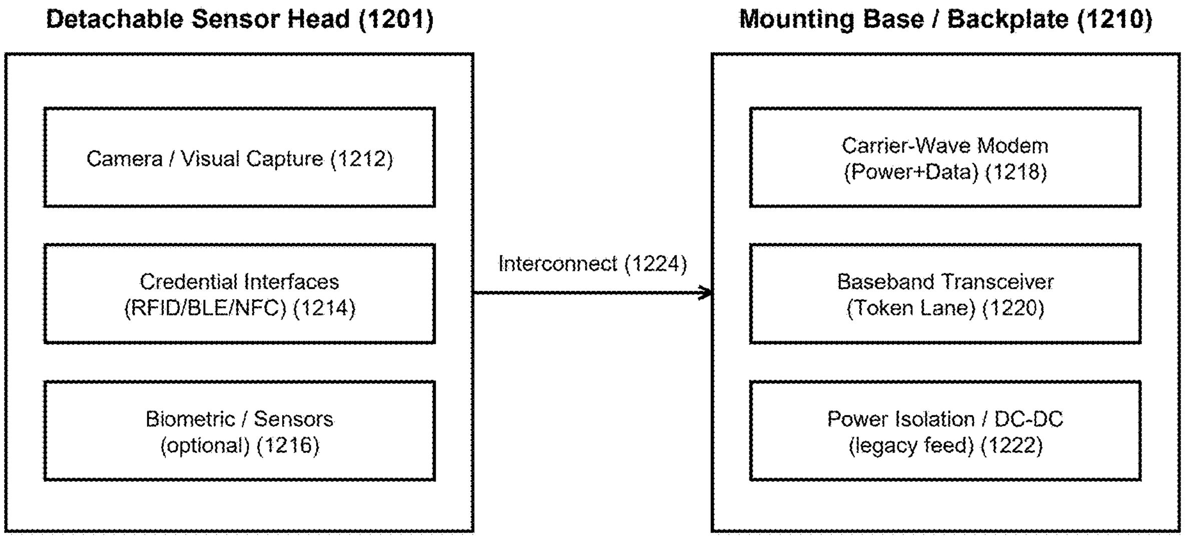
FIG. 12 illustrates an example modular reader architecture including a detachable sensor head and a mounting base/backplate containing modulation and power isolation circuitry.
Figure 13:
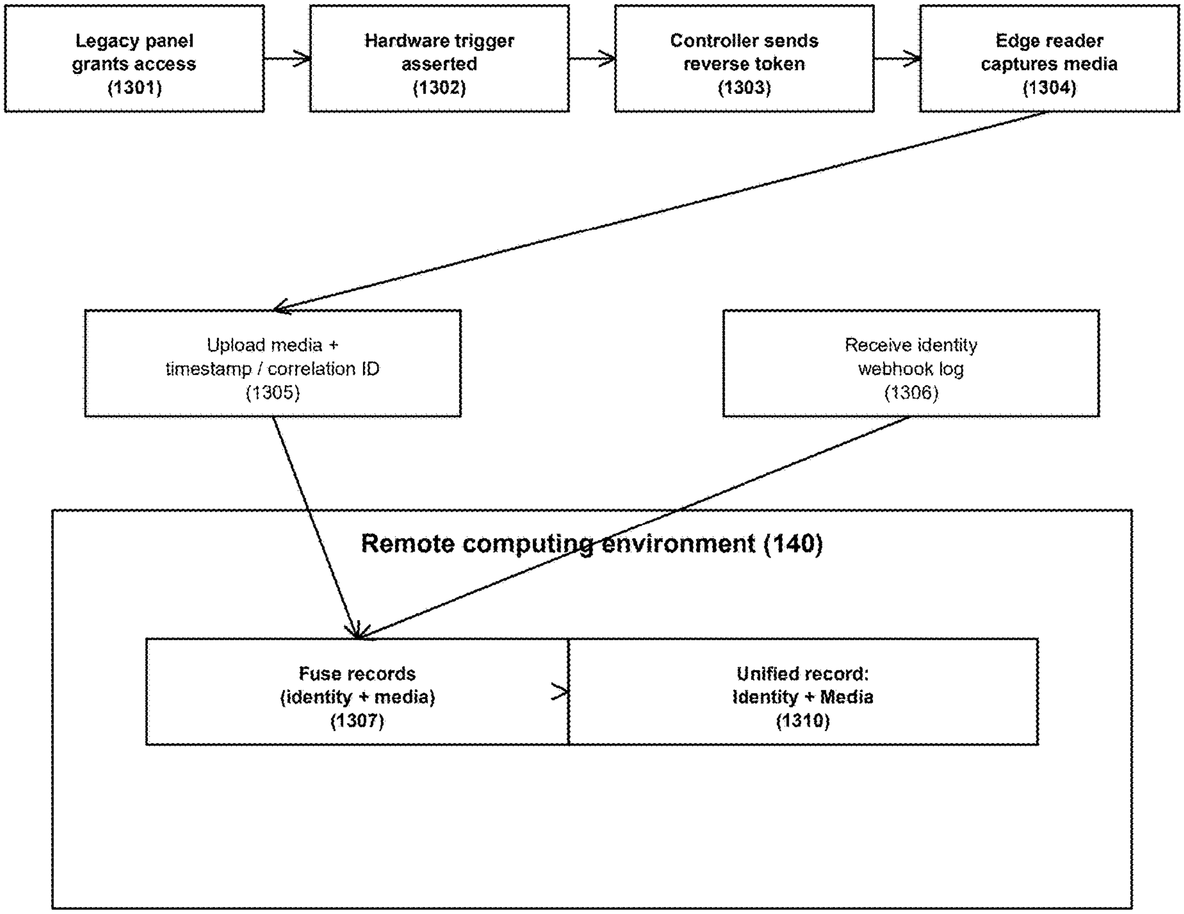
FIG. 13 illustrates an example identity fusion workflow associating deterministic capture events with separate identity logs to produce unified records.

Overview and Advanced Edge Access Control. The disclosed system includes a door-side reader device (also referred to as an edge reader) and a secure-side controller. The secure-side controller is installed on the secure side of a door and includes at least one door relay coupled to a door actuator. The reader device is installed at the access point on the non-secure side. A legacy cable connects the reader device to the secure-side controller. The reader device comprises an internal network interface and embedded cryptographic certificates (e.g., TLS certificates) provisioned at manufacturing or deployment. These embedded certificates enable the edge reader to establish a direct, secure, and encrypted communication tunnel to a remote computing environment (e.g., a distributed cloud server) completely independent of the secure-side controller. This architecture allows the reader to directly download credential databases, access policies, and firmware, while independently uploading access event logs and visual media directly to the cloud without routing through a local legacy server.

Modular Definition of Reader Device. As used herein, the term "reader device" refers broadly to the edge componentry located at or near the access point. The reader device may be implemented as a unitary housing or as a modular assembly. In some embodiments, a "smart backplate," "backpack" module, or discrete mounting back-box contains modulation circuitry, signal conditioning, power isolation, and baseband transceivers. A detachable sensor head (comprising the camera, RFID/BLE antennas, and motion sensor) detachably mates to this mounting base via a proprietary high-speed connector. Separating these components into multiple housings adjacent to one another is expressly contemplated and remains within the scope of the reader device.

Physical Wiring Interfaces. The reader device and secure-side controller include physical wiring interfaces configured to connect to field wiring. Non-limiting examples of wiring interfaces include screw-terminal blocks, push-in spring connectors, insulation-displacement connectors, and pigtail conductors configured for crimp or wire-nut connection. The wiring interfaces may be integrated into device housings or implemented as external harnesses.

Media-Agnostic Carrier-Wave Modulation & Adaptive Conditioning. The first conductor pair of the legacy cable carries DC power and modulated packet data superimposed onto the DC power. The modulated packet data is transmitted using an orthogonal frequency division multiplexing (OFDM) or multicarrier technique. Non-limiting examples include VDSL-family modulation, HomePlug-family modulation, and other carrier-wave or powerline-style modulation adapted to low-voltage security wiring. To maintain signal integrity across twisted pair, untwisted conductors, shielded cable, and mixed-gauge legacy wiring at distances exceeding standard Ethernet limits, the reader device and/or secure-side controller implement adaptive signal conditioning. This adaptive conditioning includes dynamic bit-loading, automatic gain control (AGC), equalization, slew-rate limiting, error correction, and dynamic impedance matching.

Alternative Wireless IT Lanes & Power Scavenging. While the preferred embodiment superimposes high-bandwidth IP data over the DC power wire, it is expressly contemplated that the bifurcated "Split-Brain" isolation may be achieved using alternative media. In some embodiments, the high-bandwidth IP IT lane is maintained via a wireless radio link (e.g., Wi-Fi, 5G, LTE, Bluetooth, Zigbee, Thread, or Matter), while the deterministic OT lane (the reserved door-state token) is strictly maintained over the physical, hard-wired legacy cable to provide deterministic actuation timing. In such an embodiment, the visual media and cloud database sync occur over Wi-Fi, but the door actuation remains less dependent on wireless link availability and performance. Furthermore, the reader device may scavenge operational power from alternative sources, including Power-over-Ethernet (POE), solar cells, local battery arrays, or wireless power transfer, without departing from the physically isolated, dual-lane control architecture.

Universal Wiring Permutations (Rip-and-Replace Architecture). When replacing legacy hardware, the system adapts to existing field wiring without requiring new conduit, supporting configurations ranging from 2-wire to 8-wire deployments. The reader device comprises a universal wiring interface. The operational mode of the interface may be configured manually via hardware switches, set via software toggles during installation, or automatically selected by the control logic processor based on detected line characteristics.

The 4-Wire Standard Topology (Hybrid-Link Architecture). In a preferred retrofit mode, a 4-conductor cable provides two conductor pairs. A first conductor pair carries DC electrical power and multiplexed high-bandwidth IP data (e.g., visual media payloads, biometric templates, firmware updates) superimposed onto the DC power. A second conductor pair provides a physically isolated baseband channel (the "OT lane") for transmitting secure door-state tokens utilizing a half-duplex RS-485 protocol. Because the door-state tokens traverse a physically separate copper path, congestion or delay on the packet-data lane cannot delay deterministic door actuation.

The 2-Wire Rescue Mode Topology. In scenarios where field wiring is damaged or only two conductors are available (e.g., legacy doorbell wire), the system falls back to a 2-Wire Rescue Mode. The reader device disables continuous high-bandwidth IP transmissions. The single conductor pair is utilized in a time-sliced configuration, providing trickle-charged DC power to a local energy storage component (e.g., a capacitor) within the reader device, punctuated by microsecond bursts of bidirectional baseband token data.

The 6-Wire Expanded Topology. Where legacy 6-conductor Wiegand cable is present, the first pair is utilized for multiplexed Power and IP data, and the second pair is utilized for the isolated bidirectional Token bus. The remaining third pair (the 5th and 6th conductors) is repurposed by the reader device to transmit auxiliary power (BOOST PW) to peripheral devices, or to provide a dedicated hardwired REX/DPS sensor loop back to the secure-side controller for secondary verification.

The 8-Wire Extended Topology and Conductor Aggregation. In modern deployments where twisted-pair Ethernet cable is present but the physical distance exceeds the standard 100-meter Ethernet limitation, the system utilizes the 8 conductors to bridge extended distances. Additional unused conductors are electrically bonded (e.g., paralleled) to increase current capacity, reduce voltage drop over long runs, or deliver high-current lock power directly from the secure-side controller to the edge reader.

Disjoint Namespace and Deterministic Tokens. The door-state tokens encode a selected door state, such as OPEN_PULSE, HOLD_OPEN, and RETURN_TO_SECURE, and optionally LOCKDOWN or other states. To prevent spoofing, the tokens are drawn from a reserved namespace that is disjoint from credential identifiers (e.g., by facility-code exclusion, parity pattern, header flag, frame type indicator, or token length) such that credential payloads are not carried on the OT lane. In advanced embodiments, the namespace may incorporate replay-resistance and authenticity features such as rolling counters, one-way hash chains, time-based nonces, and/or message authentication codes computed with shared secrets or asymmetric keys. The secure-side controller drives the door relay according to a shared state machine with timing, refresh cadence, precedence, and watchdog rules, and may reject tokens outside the reserved namespace.

Bidirectional Supervision and Watchdog Heartbeat. The OT lane is bidirectional and supports supervision. The secure-side controller periodically transmits a heartbeat or polling challenge to the reader device and requires a response within a timeout period. The reader device returns a cryptographic response (e.g., an HMAC or signature over a nonce and/or counter) to demonstrate liveness and authenticity. If a valid response is not received within a predefined millisecond timeout period, the secure-side controller transitions the relay to a secure locked state and/or enters a lockdown state.

Dual-Reader Shared-Bus Topology. In deployments requiring both ingress and egress access control, two or more reader devices share a multi-drop OT lane (e.g., an RS-485 bus) with a single secure-side controller. Each reader device has a unique address or identifier and transmits door-state tokens using an addressable protocol, bus arbitration, and/or time-division scheduling to avoid collisions. Both readers transmit deterministic actuation tokens and supervisory heartbeats to the controller over the shared pair, while receiving multiplexed power and packet data on separate pairs or on a shared power/data pair.

Legacy Controller Piggyback Architecture (Legacy Coexistence Mode). To preserve highly encrypted legacy credentials and avoid disrupting existing access panels, the disclosed reader device is installed adjacent to a legacy third-party reader. Legacy credential data lines (e.g., Wiegand Data 0 and Data 1, OSDP, or other panel-specific signaling lines) between the legacy reader and the legacy panel remain physically intact and electrically isolated from the disclosed reader device.

Piggyback Power Isolation. The disclosed reader device intercepts the legacy cable to receive multiplexed DC power and high-bandwidth IP data via a first conductor pair. An internal power isolation circuit (e.g., a hardware low-pass filter and/or DC-DC conditioning) removes high-frequency carrier-wave energy from the DC line and outputs clean, conditioned DC power to continuously power the legacy reader. This prevents the modulated packet data from disrupting the legacy reader.

Secure-Side Hardware Triggers and Non-Contact Sensors. In the piggyback architecture, the legacy access panel makes the core access decision. To synchronize visual capture by the disclosed reader with that decision, a secure-side hardware trigger is provided. In one embodiment, this comprises monitoring an active-low analog output terminal (e.g., the LED or Buzzer terminal) of the legacy panel via a physical hardware jumper connection to an input of the secure-side controller. In alternative advanced embodiments, the hardware trigger comprises a non-contact state-change sensor, such as an optical light sensor mounted to observe the legacy panel's access-granted LED, or a magnetic Hall-effect sensor clamped to the legacy door relay wire to measure current draw. These non-contact methods provide identical hardware-triggering capability without requiring metallic electrical contact with the legacy panel's circuitry.

Reverse Token Command and Identity Fusion. When the trigger is detected, the secure-side controller instantly transmits a deterministic "reverse token" command down the physically isolated RS-485 OT lane to the edge reader device. In response, the edge reader activates local indicators (e.g., LED and/or chime) and instantly captures visual media for transmission over the IP lane to the cloud. The reader appends a precise hardware-generated timestamp to the visual record. Simultaneously, the legacy access panel transmits its standard access log to its respective legacy head-end software. The disclosed remote computing environment receives an API webhook from the legacy head-end software containing this identity log, and algorithmically fuses the log with the visual record based on matching timestamps. This creates a unified identity and visual record without ever requiring the disclosed reader device to intercept or decrypt the highly secure legacy credential data lines.

Correlation identifiers for identity fusion. In some embodiments, the deterministic reverse-token command transmitted on the OT lane includes, or is associated with, a correlation identifier (e.g., an event ID, a nonce, a monotonic counter value, or a session identifier). The edge reader includes the correlation identifier with the captured visual media and event telemetry uploaded on the IT lane. Separately, a legacy head-end system may report an access decision using an identity log entry. The remote computing environment fuses records using the correlation identifier alone or in combination with timestamps, enabling robust association even when device clocks are imperfectly synchronized.

Additional trigger sources and sensing modalities. The secure-side trigger used to initiate a reverse-token command may be derived from various legacy panel or door signals, including: a reader LED output, a reader buzzer output, a strike/relay output state, an auxiliary output, a monitored alarm output, a lock power line voltage transition, or a current-draw signature of a relay coil or strike. Trigger sensing may be electrical (direct contact), optical (light sensor observing an indicator), magnetic/inductive (Hall-effect or clamp-on current sensor), or any other modality that detects a state change correlated with an access decision, while maintaining electrical isolation where desired.

Non-invasive monitoring of legacy signaling lines. In some embodiments, legacy credential data lines (e.g., Wiegand D0/D1, OSDP, or other legacy panel signaling) remain physically intact and are not intercepted. However, the disclosed reader device or secure-side controller may optionally include a high-impedance, non-intrusive monitor (e.g., opto-isolated tap, capacitive coupler, or inductive pickup) configured to observe signaling activity without materially loading or modifying the line. Such monitoring can be used to detect transaction timing, card-present events, or protocol framing to improve correlation of events and media capture without requiring decryption or modification of credential payloads.

Alternative lane assignments and dedicated-pair embodiments. While some embodiments superimpose high-bandwidth packet data onto DC power on a single conductor pair, other embodiments allocate physically distinct copper paths for power and packet data. For example, in a legacy cable having at least three conductor pairs, a first pair may deliver DC power, a second pair may carry the physically isolated baseband OT lane for reserved door-state tokens, and a third pair may carry packet data using a dedicated modem. In still other embodiments, packet data and power may share a pair via frequency-domain multiplexing with filtering, while the OT lane remains physically isolated on a separate pair.

Offline Resilience and Store-and-Forward Caching. To support continuous facility security during an IP network outage, the reader device comprises an offline resilience mode. If packet-network connectivity is unavailable, the reader device may continue to authenticate locally based on locally stored credential datasets and transmit reserved door-state tokens over the OT lane. Concurrently, the reader caches event logs and visual media in an encrypted, local non-volatile store-and-forward queue for upload when connectivity is restored.

The 3-in-1 Edge Architecture: Access, Visual Capture, and Intrusion. Beyond core access control, the reader device consolidates event-based visual media capture and intrusion detection. The internal control logic processor monitors local peripheral inputs, including a Door Position Sensor (DPS), a Request-to-Exit (REX) switch, and an integrated passive infrared (PIR) or radar motion sensor. The reader device may apply local intrusion logic based on active schedules provisioned from the remote computing environment. During armed periods, detected motion and/or auxiliary sensor trips trigger immediate visual capture and transmission of an intrusion alert package to the cloud, while the secure-side controller remains responsible for deterministic relay actuation based on tokens on the OT lane.

The foregoing embodiments are illustrative and not limiting. Features described in connection with one embodiment may be combined with other embodiments, and terminology such as "first" and "second" is used for convenience and does not imply limitation to a particular order or number unless expressly stated.

The invention claimed is:

1. A retrofit access control system comprising: an edge reader device; a secure-side controller comprising a door relay coupled to a door actuator; and a legacy cable extending between the edge reader device and the secure-side controller, the legacy cable comprising at least a first conductor pair and a second conductor pair; wherein: (a) the edge reader device is configured to receive DC electrical power via the first conductor pair and to communicate packet data via modulated high-bandwidth signaling superimposed on the DC electrical power on the first conductor pair using a carrier-wave modulation technique; (b) the second conductor pair provides a baseband signaling channel dedicated to conveying reserved door-state tokens between the edge reader device and the secure-side controller, the baseband signaling channel being physically isolated from the modulated high-bandwidth signaling on the first conductor pair; and (c) the secure-side controller is configured to actuate the door relay based on the reserved door-state tokens received on the second conductor pair without requiring a packet-network command.

2. The system of claim 1, wherein the carrier-wave modulation technique comprises an orthogonal frequency division multiplexing (OFDM) profile, including at least one of a VDSL or HomePlug modulation standard, to continuously transmit visual media payloads to a remote computing environment.

3. The system of claim 1, wherein each reserved door-state token is drawn from a namespace completely disjoint from credential identifiers by utilizing at least one of a facility-code exclusion, a distinct parity pattern, or a specific header flag, ensuring credential payloads are exclusively transmitted via the first conductor pair.

4. The system of claim 1, wherein the baseband signaling channel is bidirectional, and wherein the secure-side controller continuously transmits a supervisory heartbeat polling challenge to the edge reader device.

5. The system of claim 4, wherein the secure-side controller is configured to transition the door relay to a secure locked state if a valid cryptographic HMAC response to the polling challenge is not received from the edge reader device within a predefined millisecond timeout period.

6. The system of claim 1, wherein the edge reader device and the secure-side controller further comprise adaptive signal conditioning logic configured to apply dynamic impedance matching, automatic gain control, and dynamic bit-loading to maintain packet data integrity across untwisted and mixed-gauge legacy copper.

7. The system of claim 1, further comprising a third and fourth conductor pair within the legacy cable, wherein the third and fourth conductor pairs are electrically bonded in parallel to deliver high-current lock power directly from the secure-side controller to the edge reader device.

8. The system of claim 1, further comprising a second edge reader device coupled to the legacy cable, wherein the second conductor pair is configured as a multi-drop RS-485 baseband bus shared by both reader devices utilizing an addressable protocol to prevent data collisions.

9. The system of claim 1, wherein upon detecting a loss of packet data connectivity on the first conductor pair, the edge reader device automatically transitions to a local authentication mode utilizing a locally stored credential database while continuing to transmit the reserved door-state tokens over the second conductor pair.

10. The system of claim 1, wherein the edge reader device operates as an active edge security sensor by monitoring local inputs for a door position sensor and a request-to-exit switch, and transmits an intrusion alert package via the modulated high-bandwidth signaling upon detecting an unauthorized perimeter breach.

11. A method for operating a multi-lane access control architecture over legacy cabling, the method comprising: superimposing modulated high-bandwidth packet data onto a DC electrical power supply using a carrier-wave modulation technique over a first conductor pair of a legacy cable connecting an edge reader device and a secure-side controller; maintaining a physically isolated baseband signaling channel on a second conductor pair of the legacy cable; transmitting reserved door-state tokens over the physically isolated baseband signaling channel from the edge reader device to the secure-side controller; and actuating a door relay at the secure-side controller deterministically in response to the reserved door-state tokens without reliance on packet-network latency.

12. The method of claim 11, further comprising establishing a direct cryptographic Transport Layer Security (TLS) tunnel between the edge reader device and a remote cloud computing environment exclusively over the first conductor pair.

13. The method of claim 11, further comprising continuously transmitting a supervisory heartbeat challenge from the secure-side controller to the edge reader device over the second conductor pair to monitor for physical cable tampering.

14. The method of claim 11, further comprising algorithmically rejecting, at the secure-side controller, any token received over the second conductor pair that falls outside a reserved door-state namespace.

15. The method of claim 11, further comprising adaptively routing signals through a universal wiring interface at the edge reader device based upon an automatic detection of available conductor pairs in the legacy cable.

16. A universal access control reader device comprising: at least one access credential sensor; a transceiver configured to superimpose modulated packet data on a DC power input line using a carrier-wave modulation technique; an internal power isolation circuit configured to filter carrier-wave energy from the DC power input line to output conditioned DC power to a discrete legacy access reader; and a control logic processor coupled to a baseband transceiver configured to communicate on a physically isolated baseband bus distinct from the DC power input line; wherein the access control reader device is configured to maintain legacy credential data communication lines between the discrete legacy access reader and a legacy access panel in an intact and electrically isolated state relative to the control logic processor.

17. The device of claim 16, wherein the internal power isolation circuit comprises a hardware low-pass filter specifically configured to block high-frequency IP carrier waves while passing continuous DC current to power the legacy access reader.

18. The device of claim 16, wherein the legacy credential data communication lines maintained in the intact and electrically isolated state comprise Wiegand Data 0 and Data 1 wires.

19. The device of claim 16, wherein the at least one access credential sensor comprises a visual media capture module, and wherein responsive to receiving a deterministic reverse-token command from a secure-side controller over the physically isolated baseband bus, the control logic processor commands the visual media capture module to capture a visual record for transmission using the modulated packet data, thereby synchronizing visual capture with an access decision made by the legacy access panel.

20. The device of claim 19, wherein the control logic processor is configured to append a precise hardware-generated timestamp to the visual record prior to transmission, enabling algorithmic synchronization in the cloud with a separate identity log generated by the legacy access panel.

21. The device of claim 16, wherein the at least one access credential sensor is housed in a detachable exterior sensor head, and the internal power isolation circuit is housed in a modular mounting backplate.

22. A method for upgrading a legacy access control installation, the method comprising: providing an edge reader device configured to communicate packet data using carrier-wave modulation superimposed on DC power on a first conductor pair of a legacy cable; providing a physically isolated baseband channel on a second conductor pair of the legacy cable between the edge reader device and a secure-side controller; conditioning the DC power at the edge reader device to supply conditioned DC power to an existing legacy access reader while blocking carrier-wave energy from reaching the existing legacy access reader; and maintaining legacy credential data communication lines between the existing legacy access reader and a legacy access panel in an intact and electrically isolated state.

23. The method of claim 22, further comprising: detecting, at the secure-side controller, a hardware trigger signal generated by the legacy access panel indicating an access decision; transmitting a deterministic reverse-token command from the secure-side controller to the edge reader device over the physically isolated baseband channel; and executing a synchronized edge-reader action at the edge reader device responsive to the deterministic reverse-token command without reliance on packet-network latency for the trigger.

24. The method of claim 23, wherein the synchronized edge-reader action comprises capturing a visual record using a camera module onboard the edge reader device.

25. The method of claim 23, wherein detecting the hardware trigger signal comprises monitoring a physical hardware jumper wire connecting an LED output terminal or a buzzer output terminal of the legacy access panel directly to an input of the secure-side controller.

26. The method of claim 24, further comprising receiving, at a remote computing environment, an Application Programming Interface (API) webhook containing a user identity log generated by a legacy head-end system, and algorithmically fusing the user identity log with the visual record based on matching timestamps.

27. The method of claim 23, wherein the synchronized edge-reader action comprises activating a local audible chime and a visual LED indicator on the edge reader device instantly upon receipt of the deterministic reverse-token command.

28. The method of claim 22, further comprising utilizing the modulated packet data on the first conductor pair to write credential datasets directly into a local memory of the edge reader device.

29. The method of claim 24, further comprising receiving an active intrusion schedule from a remote computing environment, and dynamically configuring an internal motion sensor of the edge reader device to trigger the visual record capture during armed periods.

30. The method of claim 22, further comprising automatically falling back to a 2-wire rescue mode utilizing time-sliced power delivery if the edge reader device detects damage to the second conductor pair.

* * * * *